(12) United States Patent
Misawa et al.

(10) Patent No.: US 8,860,849 B2
(45) Date of Patent: Oct. 14, 2014

(54) IMAGING DEVICE AND METHOD

(75) Inventors: Takeshi Misawa, Saitama (JP); Tomokazu Nakamura, Saitama (JP); Kenji Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 901 days.

(21) Appl. No.: 13/015,828

(22) Filed: Jan. 28, 2011

(65) Prior Publication Data

US 2011/0242369 A1    Oct. 6, 2011

(30) Foreign Application Priority Data

Mar. 30, 2010    (JP) ................. 2010-078142

(51) Int. Cl.
*H04N 5/262* (2006.01)
*H04N 5/232* (2006.01)
*H04N 13/02* (2006.01)
*H04N 5/225* (2006.01)

(52) U.S. Cl.
CPC ....... *H04N 5/23293* (2013.01); *H04N 5/23296* (2013.01); *H04N 13/0239* (2013.01); *H04N 5/2258* (2013.01); *H04N 5/232* (2013.01); *H04N 13/0285* (2013.01)
USPC ..................................... 348/240.2

(58) Field of Classification Search
CPC . H04N 5/23296; H04N 5/2628; H04N 5/232; H04N 5/772; H04N 7/181; H04N 7/183; H04N 7/18; H04N 5/23293; G02B 15/173; G02B 7/102; G02B 2213/025
USPC ........ 348/240.99–240.3, 333.02–333.03, 143
See application file for complete search history.

(56) References Cited

U.S. PATENT DOCUMENTS

| | | | | |
|---|---|---|---|---|
| 5,005,083 A | * | 4/1991 | Grage et al. | 348/588 |
| 5,436,660 A | * | 7/1995 | Sakamoto | 348/229.1 |
| 7,071,971 B2 | * | 7/2006 | Elberbaum | 348/211.11 |
| 7,593,036 B2 | * | 9/2009 | Shiraki | 348/207.2 |
| 7,646,420 B2 | * | 1/2010 | Misawa et al. | 348/345 |
| 7,724,300 B2 | * | 5/2010 | Misawa et al. | 348/345 |

(Continued)

FOREIGN PATENT DOCUMENTS

| | | |
|---|---|---|
| JP | 2004-207774 A | 7/2004 |
| JP | 2006-238326 A | 9/2006 |
| JP | 2009-212804 A | 9/2006 |
| JP | 2009-171428 A | 7/2009 |

*Primary Examiner* — Aung S Moe
(74) *Attorney, Agent, or Firm* — Birch, Stewart, Kolasch & Birch, LLP

(57) ABSTRACT

In a stereoscopic imaging device including a plurality of imaging optical systems, a wide-image in which a principal subject is shifted from the center is taken, and also, a tele-image in which the principal subject is enlarged is taken at the same time. A size of a wide-side frame W, that is, a size of an angle of view of a trimming wide-image is decided based on a size of a tele-side frame T, that is, a zoom magnification of a tele-side imaging optical system, a position of the wide-side frame W displayed in the decided size is arbitrarily moved depending on an instruction from an operation unit, an area delimited by the wide-side frame W moved to any position is clipped from a default wide-image, and thereby, the trimming wide-image is obtained. Thereby, the tele-image which is a telephoto image in which a desired subject is zoomed, and the trimming wide-image which is a wide-angle image in which the subject can exist at a position other than the center of the image are simultaneously obtained.

11 Claims, 20 Drawing Sheets

(56) References Cited

U.S. PATENT DOCUMENTS

| | | | |
|---|---|---|---|
| 7,834,928 B2* | 11/2010 | Misawa et al. | 348/345 |
| 7,965,314 B1* | 6/2011 | Miller et al. | 348/164 |
| 8,098,287 B2* | 1/2012 | Misawa et al. | 348/208.12 |
| 8,125,521 B2* | 2/2012 | Itokawa | 348/143 |
| 8,379,113 B2* | 2/2013 | Nakazawa | 348/240.1 |
| 8,553,129 B2* | 10/2013 | Huang et al. | 348/333.05 |
| 2003/0020814 A1* | 1/2003 | Ono | 348/220.1 |
| 2003/0160886 A1* | 8/2003 | Misawa et al. | 348/347 |
| 2007/0058961 A1* | 3/2007 | Kobayashi et al. | 396/88 |
| 2007/0222858 A1* | 9/2007 | Sugimoto | 348/143 |
| 2008/0030592 A1* | 2/2008 | Border et al. | 348/218.1 |
| 2008/0055412 A1* | 3/2008 | Tanaka | 348/159 |
| 2008/0079824 A1* | 4/2008 | Sawachi | 348/240.1 |
| 2010/0157107 A1* | 6/2010 | Iijima et al. | 348/240.99 |
| 2010/0265331 A1* | 10/2010 | Tanaka | 348/159 |
| 2011/0074770 A1* | 3/2011 | Robinson et al. | 345/419 |
| 2012/0050578 A1* | 3/2012 | Aoki et al. | 348/240.2 |

* cited by examiner

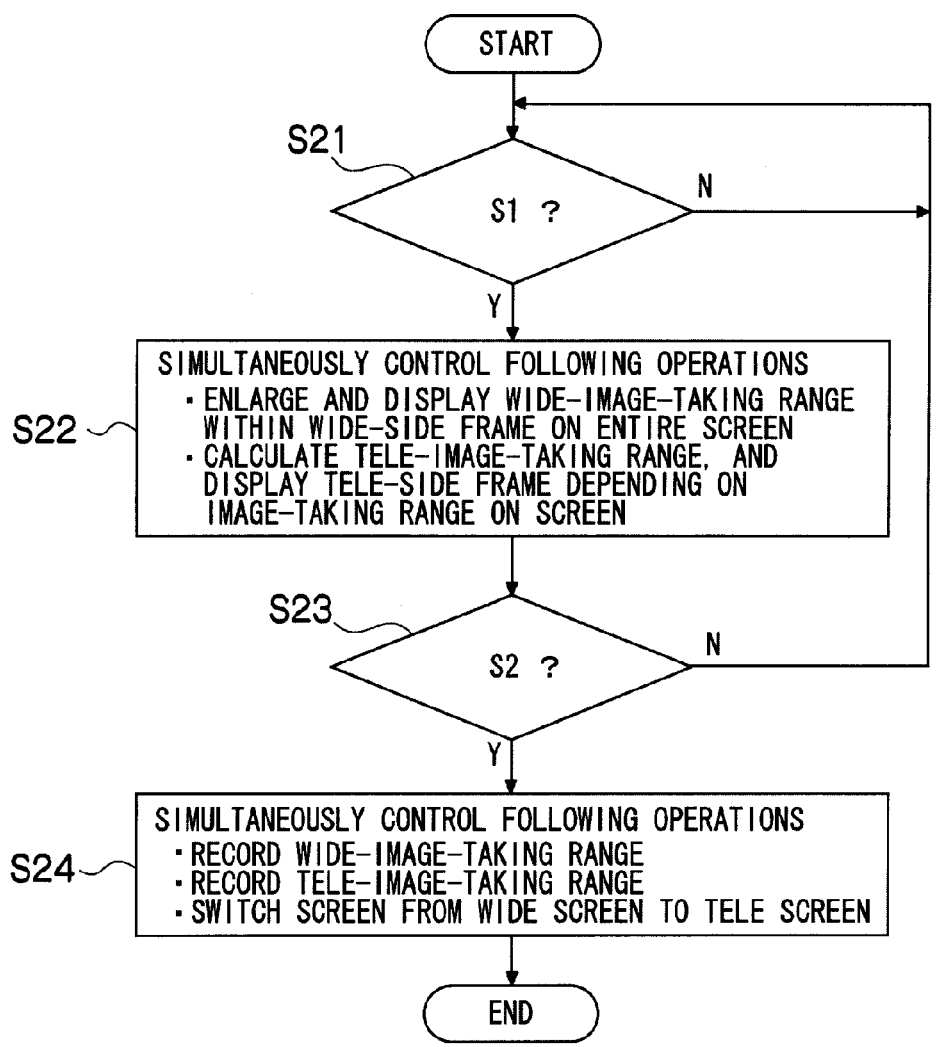

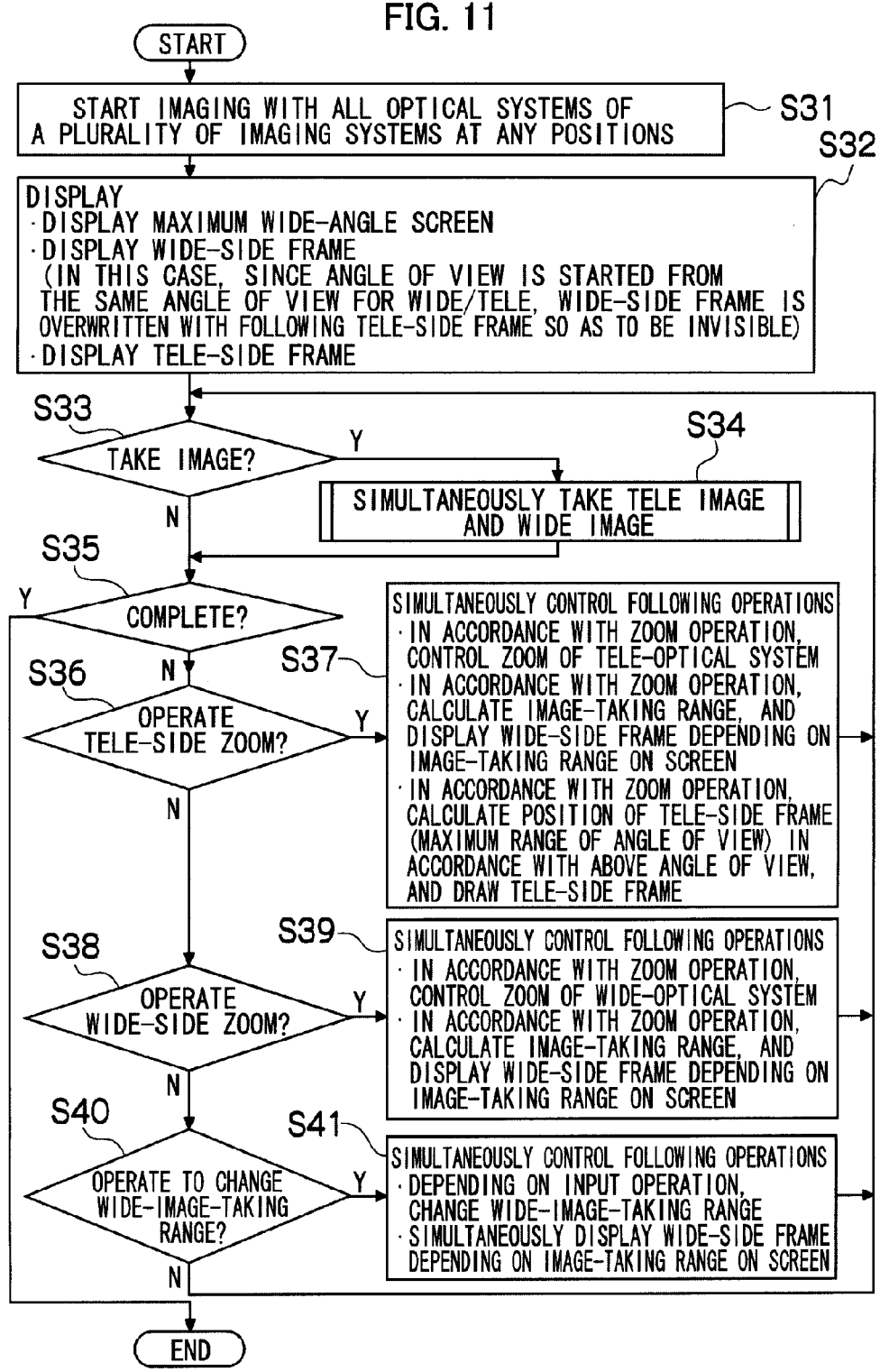

R

L

R

R

IMAGING DEVICE AND METHOD

BACKGROUND OF THE INVENTION

1. Field of the Invention

The present invention relates to an imaging device which can image a plurality of viewpoint images by a plurality of image pickup devices, and more particularly, to a technique for picking up a telephoto image and a wide-angle image of the same subject by the plurality of image pickup devices of the imaging device.

2. Description of the Related Art

A camera described in Japanese Patent Application Laid-Open No. 2004-207774 includes two image-taking systems which are independent from each other and generally the same, and each of which includes an imaging optical system and an imaging element. Japanese Patent Application Laid-Open No. 2004-207774 discloses that the imaging optical system includes an imaging lens, a focus lens, an aperture and the like, screens corresponding to two independent imaging systems are displayed on a display so as to be apposed, and a wide-image from the other imaging system is displayed on the display so as to be superimposed on a tele-image from one imaging system.

A camera apparatus of Japanese Patent Application Laid-Open No. 2006-238326 obtains information on an image-taking range of a telecamera unit in an image-taking field of view of a wide-angle camera unit at a time point when a telephoto image is taken, and also decides a wide-angle image to be associated with the telephoto image, by a device which determines a wide-angle image which is more accurate for displaying the image-taking range, and transmits the taken telephoto image along with the image-taking range information and information specifying the wide-angle image. In an apparatus which reproduces taken video at a location distant from the camera apparatus, reproduction of telephoto video is synchronized with reproduction of wide-angle video so that a telephoto image-taking range can be indicated on a display of the wide-angle image specified by each telephoto image.

Japanese Patent Application Laid-Open No. 2009-212804 is an example of composition assist.

When a plurality of imaging optical systems of an imaging device which takes a parallax image for stereoscopic display are set on telephoto and wide-angle sides, respectively, and images of the same subject are simultaneously taken, a wide-angle (wide) image in which a principal subject is located at the center (FIG. 21A), and a telephoto (tele) image in which the principal subject is zoomed up (FIG. 21B) are obtained.

The image in which the principal subject is located at the center as illustrated in FIG. 21A is commonly referred to as "rising sun flag composition", and is regarded as a typical monotonously-finished image. Consequently, as illustrated in FIGS. 22A and 22B, it is desired to obtain a wide-angle image in which the principal subject is shifted from the center (FIG. 22A) and a zoomed image of the principal subject (FIG. 22B).

However, in a camera which takes the parallax image for the stereoscopic display, since respective optical axes of the plurality of imaging optical systems need to be aligned, it is difficult to take the wide-image in which the principal subject is shifted from the center, and also take the tele-image in which the principal subject is enlarged, at the same time.

SUMMARY OF THE INVENTION

The present invention has been made in view of the above situation, and an object of the present invention is to provide a technique in which, in a stereoscopic imaging device including a plurality of imaging optical systems, it is possible to take a wide-image in which a principal subject is shifted from the center, and also take a tele-image in which the principal subject is enlarged, at the same time.

The present invention provides an imaging device which includes a plurality of imaging units each having an imaging optical system and an imaging element on which a subject image is formed by the imaging optical system, so that the imaging device is capable of obtaining respective viewpoint images from the plurality of imaging units, the imaging device including an image-taking magnification setting unit which varies a focal length of a first imaging unit in which the focal length of the imaging optical system is variable, in the plurality of imaging units, and thereby sets a desired image-taking magnification of the first imaging unit; a trimming area decision unit which decides a size of a trimming area which is a partial area capable of including a subject of an image-taking angle of view of the first imaging unit at a desired position, based on the image-taking magnification set by the image-taking magnification setting unit, within an image-taking angle of view of a second imaging unit having the image-taking angle of view larger than the image-taking angle of view of the first imaging unit in the plurality of imaging units; a display unit which displays a trimming range representing the trimming area having the size decided by the trimming area decision unit, and a first imaging range which is a graphic indicating the subject of the image-taking angle of view of the first imaging unit, so as to be superimposed on a second image which is a wide-angle viewpoint image obtained by the second imaging unit; a trimming position setting unit which arbitrarily sets a position of the trimming range within the second image displayed on the display unit; and an image output unit which, in response to a predetermined instruction being inputted, outputs a first image obtained by the first imaging unit in which the desired image-taking magnification is set by the image-taking magnification setting unit, and also, clips a trimming image delimited by the trimming range having the size decided by the trimming area decision unit and the position set by the trimming position setting unit, from the second image, and outputs the trimming image.

In response to a predetermined image-taking preparation instruction being inputted, the display unit displays the first imaging range so as to be superimposed on the trimming image outputted by the image output unit.

In response to a predetermined image-taking start instruction being inputted, the display unit displays the first image outputted by the image output unit.

The image-taking magnification setting unit varies a focal length of the second imaging unit in which the focal length of the imaging optical system is variable, and thereby sets a desired image-taking magnification of the second imaging unit, the trimming area decision unit decides the size of the trimming area which is the partial area capable of including the subject of the image-taking angle of view of the first imaging unit at the desired position, within the image-taking angle of view of the second imaging unit, based on the image-taking magnification of the first imaging unit and the image-taking magnification of the second imaging unit which are set by the image-taking magnification setting unit, and the display unit displays the trimming range representing the trimming area having the size decided by the trimming area decision unit, and the first imaging range, so as to be superimposed on the second image.

The display unit displays a graphic indicating a maximum angle of view of the second imaging unit, so as to be superimposed on the second image.

The display unit displays the first image and the second image as left and right viewpoint images.

The imaging device further includes a display setting unit which sets whether one of the first image and the second image is displayed as the left viewpoint image or the right viewpoint image, wherein the display unit displays one of the first image and the second image, as any one of the left and right viewpoint images, based on the setting in the display setting unit.

The trimming position setting unit sets the position of the trimming range so as to conform to a predetermined composition.

The imaging device further includes a face detection unit which detects a face of a person who is the subject, from the second image, wherein the trimming position setting unit sets the position of the trimming range so as to include the face detected by the face detection unit.

The present invention provides an imaging method in which an imaging device including a plurality of imaging units each having an imaging optical system and an imaging element on which a subject image is formed by the imaging optical system, so that the imaging device is capable of obtaining respective viewpoint images from the plurality of imaging units, executes the steps of varying a focal length of a first imaging unit in which the focal length of the imaging optical system is variable, in the plurality of imaging units, and thereby setting a desired image-taking magnification of the first imaging unit; deciding a size of a trimming area which is a partial area capable of including a subject of an image-taking angle of view of the first imaging unit at a desired position, based on the set image-taking magnification, within an image-taking angle of view of a second imaging unit having the image-taking angle of view larger than the image-taking angle of view of the first imaging unit in the plurality of imaging units; displaying a trimming range representing the trimming area having the decided size, and a first imaging range which is a graphic indicating the subject of the image-taking angle of view of the first imaging unit, so as to be superimposed on a second image which is a wide-angle viewpoint image obtained by the second imaging unit; arbitrarily setting a position of the trimming range within the displayed second image; and in response to a predetermined instruction being inputted, outputting a first image obtained by the first imaging unit in which the desired image-taking magnification is set, and also, clipping a trimming image delimited by the trimming range having the decided size and the set position, from the second image, and outputting the trimming image.

The present invention also includes a programmable storage medium tangibly embodying a program of machine-readable instructions executable by an imaging device to execute this imaging method.

According to this process, a tele-range having a position and a size (zoom magnification) surrounding any subject in a default wide-image is displayed, and also, a trimming wide-range including the tele-range is displayed, so that angles of view of both can be confirmed. In addition, the tele-image which is a telephoto image in which the subject in the tele-range is zoomed, and a trimming wide-image which is a wide-angle image which can include the subject at any position other than the center of the image can be simultaneously obtained.

BRIEF DESCRIPTION OF THE DRAWINGS

FIG. 9 is a flowchart of the main section of the image taking process according to a third embodiment;

FIG. 11 is a flowchart of the image taking process according to a fourth embodiment;

DETAILED DESCRIPTION OF THE PREFERRED EMBODIMENTS

First Embodiment

Figure 1:
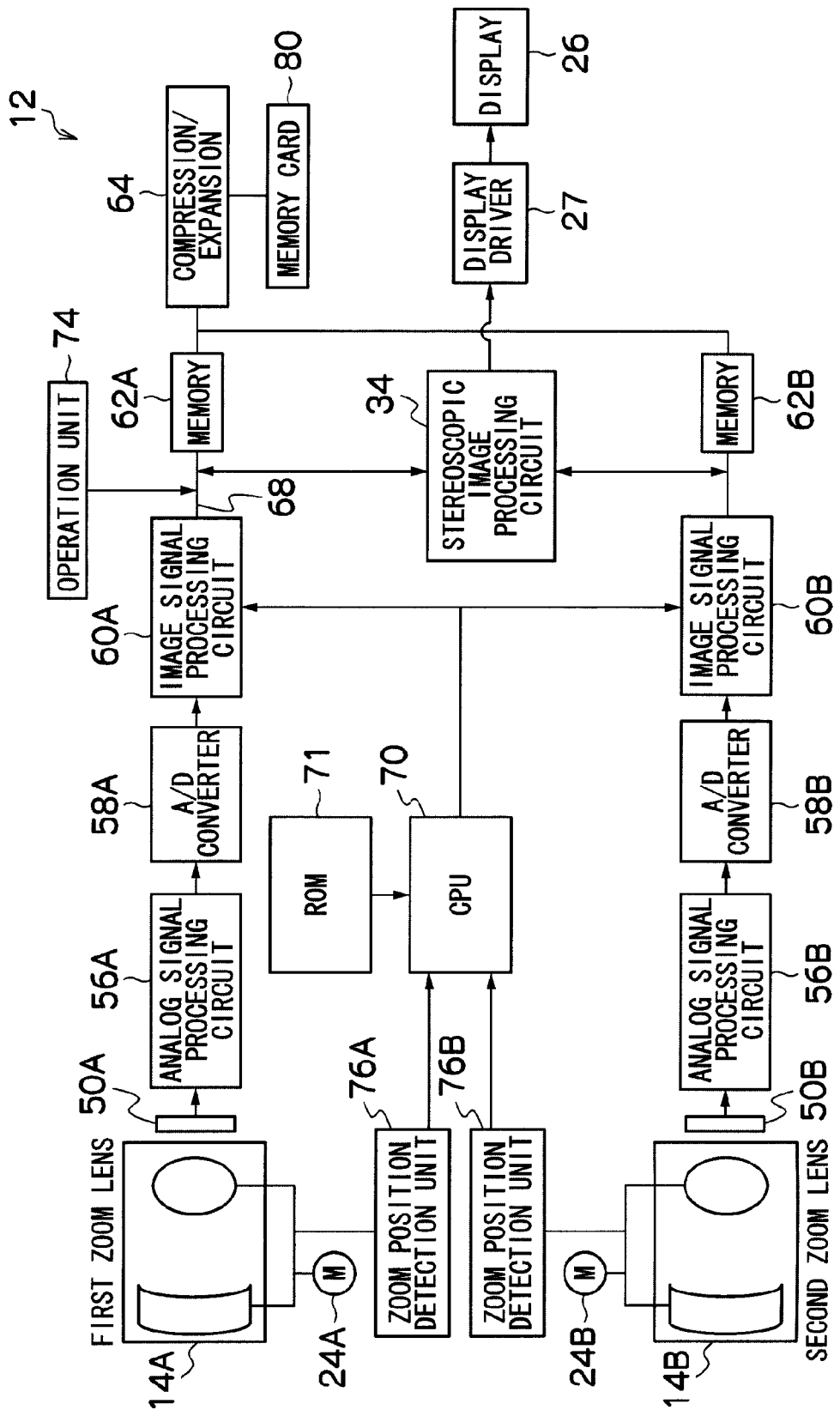
FIG. 1 is a diagram illustrating an electrical configuration of a camera.

FIG. 1 illustrates an electrical configuration of a camera according to a preferred embodiment of the present invention. Each of imaging optical systems 14A and 14B includes a zoom lens, a focus lens, an aperture and the like. It is assumed that a convergence angle between optical axes of the imaging optical systems 14A and 14B is mechanically fixed. It should be noted that three or more imaging optical systems may exist.

In response to an operation on a zoom button of an operation unit 74, lens motors 24A and 24B move the zoom lenses of the imaging optical systems 14A and 14B, along lens optical axes, to a tele side (extension side)/wide side (collapsing side), and change focal lengths (image-taking magnifications).

Although not illustrated, in an AE (Auto Exposure) operation, iris motors vary aperture values of the respective apertures of the imaging optical systems 14A and 14B so as to limit light fluxes, and thereby perform exposure adjustment. Moreover, in an AF (Auto Focus) operation, focus lens motors move the respective focus lenses of the imaging optical systems 14A and 14B, along the lens optical axes, to a NEAR-side (extension side) or an INF-side (collapsing side) so as to change focused positions, and thereby perform focus adjustment.

If a stereoscopic mode is set as an imaging mode from the operation unit 74, a CPU 70 controls the lens motors 24A and 24B to adjust the focal lengths of the zoom lenses of the imaging optical systems 14A and 14B so that the image-taking magnifications become generally the same as each other, depending on the operation on the zoom button of the operation unit 74.

If a two-image taking mode is set as the imaging mode from the operation unit 74, the CPU 70 controls the lens motors 24A and 24B to arbitrarily set the focal lengths of the zoom lenses of both the imaging optical systems 14A and 14B, depending on the operation on the zoom button of the operation unit 74. For example, the CPU 70 sets the focal length of one of the imaging optical systems 14A and 14B to a wide-angle side, and also sets the focal length of the other of the imaging optical systems 14A and 14B to a telephoto side. For simplification of the description, in a case of the two-image taking mode, it is assumed that the zoom lens (first zoom lens) of the imaging optical system 14A is set to the wide-angle side, and the zoom lens (second zoom lens) of the imaging optical system 14B is set to the telephoto side. However, opposite setting is also possible.

Two imaging elements 50A and 50B including area CCD sensors and the like are arranged at positions corresponding to focus positions of the imaging optical systems 14A and 14B within a main body 12. As described above, light reflecting on a subject and entering the imaging optical systems 14A and 14B is formed on light receiving surfaces of the imaging elements 50A and 50B, respectively.

Each of the imaging elements 50A and 50B outputs an analog signal representing an amount of received light in each of a large number of photoelectric conversion cells arranged in a matrix manner on the light receiving surface, as an image signal. Each of the imaging elements 50A and 50B is driven at a timing synchronized with a timing signal generated by a timing signal generation unit connected to a drive circuit (not illustrated), and outputs the image signal.

The apertures (not illustrated) are arranged between the imaging optical systems 14A and 14B and the imaging elements 50A and 50B, respectively. The aperture may be configured as a single aperture which can be continuously changed, or may be configured so that the aperture is switched among a plurality of apertures having different aperture amounts.

Also, a strobe control circuit (not illustrated) which controls strobe light emission is further connected to the timing signal generation unit. If it is detected that a strobe has low illumination, or if a user instructs to emit the light, the light emission is controlled at the timing synchronized with the timing signal generated by the timing signal generation unit.

Analog signal processing circuits 56A and 56B, A/D converters 58A and 58B, image signal processing circuits 60A and 60B, memories 62A and 62B, and a compression/expansion unit 64 are connected in order to signal output ends of the imaging elements 50A and 50B, respectively, and connected to a system bus 68, respectively, so as to be controlled by the CPU 70 connected to the system bus 68, in an integrated manner.

The analog signal processing circuits 56A and 56B sample the image signals outputted from the imaging elements 50A and 50B, at the timing synchronized with the timing signal generated by the timing signal generation unit, and also amplify and output the image signals to the A/D converters 58. The analog signal processing circuits 56 are configured to include CDS (Correlated Double Sampling, hereinafter referred to as "CDS") units (not illustrated). Each CDS unit has, for example, a clamp circuit which clamps various kinds of noise which are basically caused by a CCD-type imaging element being used, in accordance with the timing signal from the timing signal generation unit, and a sample-hold circuit which holds an analog voltage signal in accordance with the timing signal. The CDS units eliminate noise components and transmit the image signals as analog output signals to the A/D converters 58A and 58B. The image signals outputted from the analog signal processing circuits 56A and 56B are converted into digital image data by the A/D converters 58A and 58B, and inputted to the image signal processing circuits 60A and 60B. The image signal processing circuits 60A and 60B perform various kinds of image processing, such as color correction, γ correction and Y/C conversion, to the inputted image data. The image data outputted from the image signal processing circuits 60 is temporarily stored in the memories 62A and 62B including a RAM and the like. Then, the image data is compressed by the compression/expansion unit 64, and then stored in a memory card 80 inserted into a slot.

Moreover, a display driver 27 which drives a display 26 is also connected to the system bus 68 so that an image based on image data obtained by image taking can be displayed, and the display is controlled by the display driver 27 so that various display modes are displayed.

In a case of the stereoscopic mode, the image data in the memories 62A and 62B is converted into stereoscopic image data by a stereoscopic image processing circuit 34, and then displayed as stereoscopic images on the display 26 via the display driver 27.

In the case of the two-image taking mode, the image data in the memories 62A and 62B is displayed as plane images on the display 26. Details thereof will be described later.

While a detailed structure of the display 26 is not illustrated, the display 26 includes a parallax barrier display layer on a surface thereof. When stereoscopic display is performed, in the display 26, a parallax barrier including a pattern, in which light transmissive portions and light blocking portions are alternately arranged at a predetermined pitch, is generated on the parallax barrier display layer, and also, on an image display surface which is a lower layer thereof, strip-shaped image fragments representing left and right images are alternately arranged and displayed, and thereby, pseudo-stereoscopic viewing is enabled.

Instead of reconstructing viewpoint images obtained from the imaging elements 50A and 50B as the strip-shaped image fragments and alternately arranging the strip-shaped image fragments, if only a right or left viewpoint image obtained from one of the imaging elements 50A and 50B is reconstructed as the strip-shaped image fragments and the strip-shaped image fragments are alternately arranged, the same plane image is viewed by both right and left eyes of a viewer.

Alternatively, if the strip-shaped fragments of two viewpoint images obtained in the two-image taking mode are alternately arranged, one of the viewpoint images and the other of the viewpoint images are visually perceived as plane images by the right and left eyes of the viewer, respectively, and such a state where two plane images are superimposed can be observed.

Furthermore, the operation unit 74 including a release switch, a zoom button, a menu switch, an execution/screen switching switch, a selection switch, a cancel switch, an image taking mode switching switch and the like is connected to the system bus 68, and the CPU performs control depending on the operation on the operation unit 74.

In other words, if an instruction to store the image data into the memory card 80 is issued by the operation on the release switch or the like, the CPU 70 reads the image data which is temporarily stored in the memories 62A and 62B, and transfers the image data to the compression/expansion unit 64. Thereby, the image data is compressed by the compression/expansion unit 64, and then stored in the memory card 80. The number of pixels of the image data is a predetermined value, for example, such as 10 M pixels. It should be noted that the image data may also be stored in the memory card 80 without being compressed, depending on the mode for the image taking.

Moreover, if an instruction to reproduce (display) the images represented by the image data stored in the memory card 80 is issued, the image data is read from the memory card 80, and the read image data is expanded (decompressed) by the compression/expansion unit 64, and then temporarily stored in the memories 62A and 62B. Then, the image data which is temporarily stored in the memories 62A and 62B is used to display (reproduce) the images on the display 26.

Positions of the zoom lenses (zoom positions) of the imaging optical systems 14A and 14B are detected by zoom position detection units 76A and 76B, respectively, and detection signals thereof are inputted as information for varying magnifications of the zoom lenses, to the CPU 70. Based on this information for varying the magnifications, the CPU 70 can control a target magnification which is arbitrarily set via the zoom button of the operation unit 74, and the image-taking magnifications for the subject via the zoom lenses which are actually driven by the lens motors 24, so as to coincide with each other.

Figure 2:
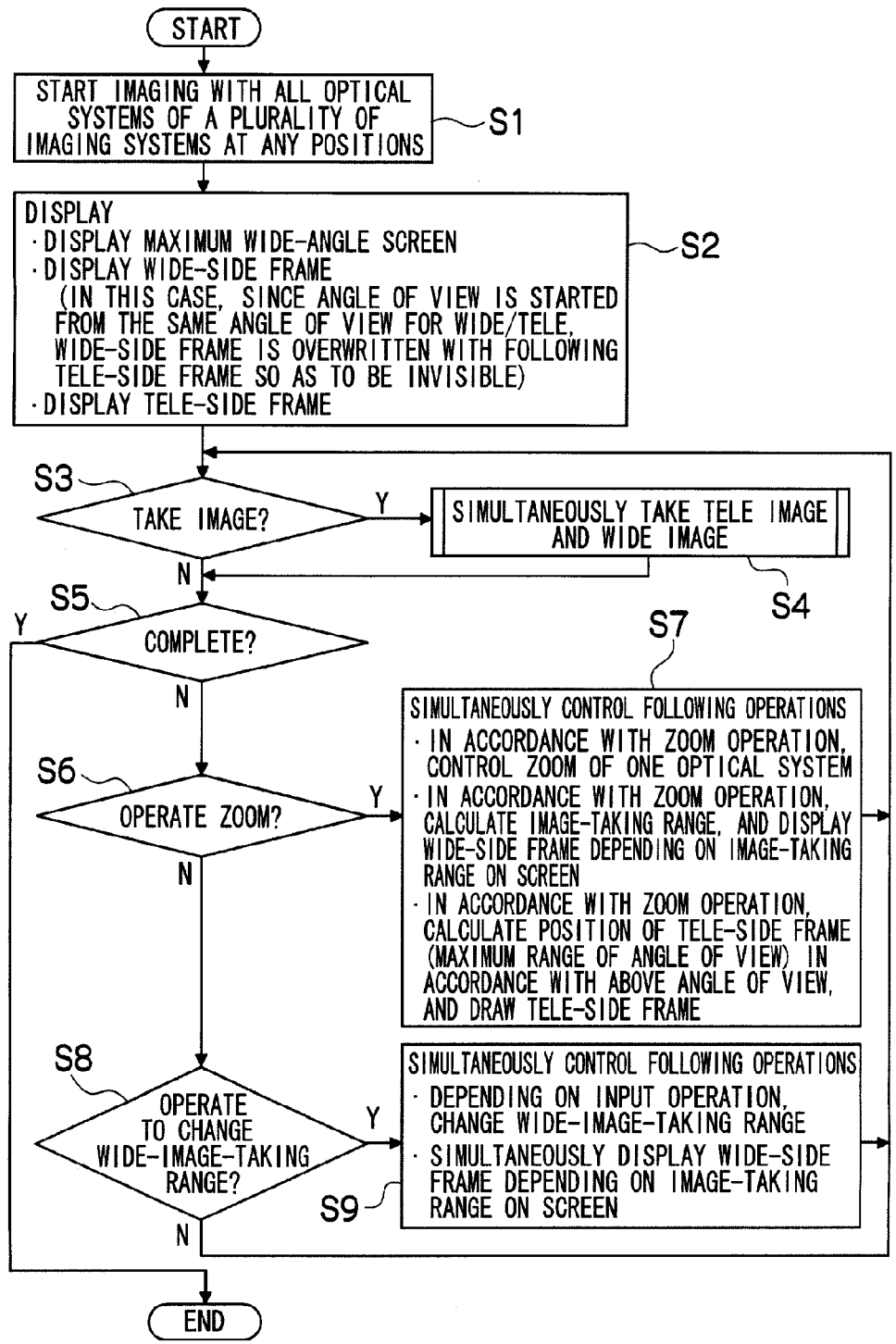
FIG. 2 is a flowchart of an image taking process according to a first embodiment.

FIG. 2 illustrates a flowchart of an image taking process whose execution is controlled by the CPU 70. A program for causing the CPU 70 to execute this process is stored in a computer-readable storage medium such as a ROM 71.

In S1, in response to the two-image taking mode being set from the operation unit 74, the CPU 70 controls the lens motors 24A and 24B to set initial zoom positions of the first zoom lens and the second zoom lens. For example, the initial zoom positions of the first zoom lens and the second zoom lens may be any of the following positions. It should be noted that if the stereoscopic mode is set from the operation unit 74, the following process is not performed, and stereoscopic viewing of taken viewpoint images is performed.

1) The zoom positions of the first zoom lens and the second zoom lens, which have been set when S7 is executed in a previous image taking process (the zoom positions may not be a wide end or a tele end).

2) Both initial zoom positions are at the wide end.

3) One initial zoom position is at the wide end, and the other initial zoom position is at the tele end.

In a case of 1), the image taking can be immediately executed. In a case of 2), a configuration of an angle of view confirmation screen to be described later becomes simple. In a case of 3), limits of angles of view of the two imaging optical systems can be easily confirmed on the angle of view confirmation screen. The initial zoom positions may be able to be arbitrarily set from the operation unit 74 before the image taking process is started, and the zoom lens of one of the imaging optical systems does not necessarily need to exist at the wide end. Here, 2) is employed as an example.

In S2, the CPU 70 displays the angle of view confirmation screen on the display 26. On this angle of view confirmation screen, a default wide-image is displayed as a plane image in a predetermined size within the display 26. The default wide-image is a viewpoint image itself which is obtained from a wide-side imaging optical system with one of the initial zoom positions of the first zoom lens and the second zoom lens, which is set closer to the wide side. Here, the wide-side imaging optical system is the imaging optical system 14A corresponding to the first zoom lens. For example, the predetermined size is assumed to be a maximum size in which the default wide-image fits within the display 26. The default wide-image is periodically obtained from the imaging optical system 14A and updated. This default wide-image may also be referred to as "through image", "live view" or the like.

On the angle of view confirmation screen, a tele-side frame T indicating a partial area within a wide-image is superimposed. The partial area corresponds to an image-taking angle of view of a tele-image which is an image obtained from a tele-side imaging optical system with one of the initial zoom positions of the first zoom lens and the second zoom lens, which is set closer to the tele side. Here, the tele-side imaging optical system is the imaging optical system corresponding to the second zoom lens.

Moreover, on the angle of view confirmation screen, a wide-side frame W is superimposed. The wide-side frame W indicates an outer edge of a trimming wide-image for clipping a partial area so that the tele-image is positioned at a desired position (a zoomed-up subject is positioned in a desired composition), from the default wide-image.

As will be described later, a position and a size of the wide-side frame W are restricted by a position and a size of the tele-side frame T, and the position and the size of the wide-side frame W can be arbitrarily designated within a range which is not subjected to the restriction.

The wide-side frame W and the tele-side frame T are assigned with graphic attributes which can be distinguished from each other. For example, the wide-side frame W is drawn in a red color, while the tele-side frame T is drawn in a green color.

If the initial zoom positions of the first zoom lens and the second zoom lens are the same, the position of the wide-side frame W coincides with the position of the tele-side frame T. In this case, the wide-side frame W may be overwritten with the tele-side frame T so as to be invisible.

Figure 3:
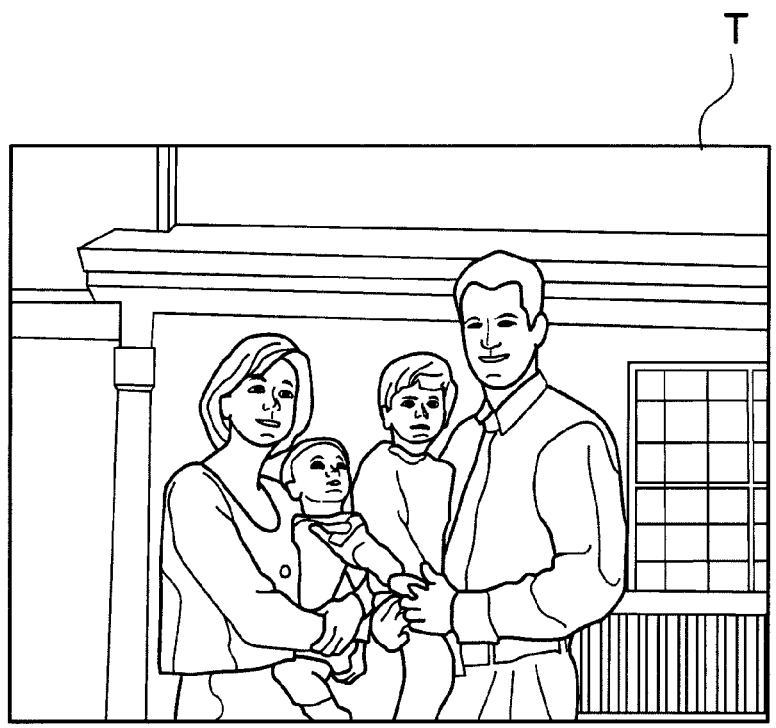
FIG. 3 is a diagram illustrating an example of an angle of view confirmation screen.

FIG. 3 illustrates an example of the angle of view confirmation screen. In this figure, both the initial zoom positions of the first zoom lens and the second zoom lens are at the wide end, and both the wide-image and the tele-image are images (full-wide-images) taken by the zoom lenses at the wide end. The tele-side frame T coincides with outer frames of both the wide-image and the tele-image.

In S3, the CPU 70 determines whether or not an instruction to execute two-image taking is issued from the operation unit 74. If Yes, the process proceeds to S4, and if No, the process proceeds to S5.

In S4, the CPU 70 images and obtains the tele-image from the tele-side imaging optical system in which the second zoom lens is set at the initial zoom position (here, the imaging optical system 14B corresponding to the second zoom lens), and also clips an image included in the wide-side frame W which is set in the default wide-image imaged by the wide-side imaging optical system depending on the above instruction, and obtains the trimming wide-image. The tele-image and the trimming wide-image which have been obtained can be saved in the memories 62A and 62B, and recorded in the memory card 80. The default wide-image may also be recorded in the memory card 80 along with the tele-image and the trimming wide-image. A subject whose tele-image is taken and a zoom magnification of the tele-image are indicated by the position and the size of the tele-side frame T drawn in S2 or S7, and a size and a clip position of the trimming wide-image are indicated by the wide-side frame W drawn in S2 or S9.

In S5, the CPU 70 determines whether or not an instruction to complete the image taking is issued from the operation unit 74. If Yes, the process is completed, and if No, the process proceeds to S6.

In S6, the CPU 70 determines whether or not an instruction to perform a zoom operation for the tele-side imaging optical system is issued from the operation unit 74. If Yes, the process proceeds to S7, and if No, the process proceeds to S8.

The zoom operation as herein referred to includes a first instruction to vary the size of the tele-side frame T, that is, the zoom magnification. For example, after the tele-side imaging optical system to be subjected to the zoom operation is selected, zoom out (magnification reduction) and zoom in (magnification enlargement) performed by depressing a wide/tele button on the zoom button can be inputted as the first instruction from the operation unit 74.

In S7, based on the first instruction, the CPU 70 controls the lens motor 24B to drive the zoom lens of the tele-side imaging optical system, and sets the zoom magnification corresponding to the first instruction.

The CPU 70 draws a graphic of the tele-side frame T having the position and the size corresponding to the image-taking angle of view of the tele-side imaging optical system after the zoom magnification is set, within the default wide-image on the angle of view confirmation screen. If the center of the optical axis of the tele-side imaging optical system and the center of the optical axis of the wide-side imaging optical system generally coincide with each other, the position of the tele-side frame T within the default wide-image is near the center of the default wide-image. The size of the tele-side frame T within the default wide-image can be decided depending on a ratio of the zoom magnification of the tele-side imaging optical system to the zoom magnification of the wide-side imaging optical system. Generally, a display size of the tele-side frame T becomes smaller as the zoom magnification of the tele-side imaging optical system becomes larger, or becomes smaller as the zoom magnification of the wide-side imaging optical system becomes smaller.

Next, based on the zoom magnification designated in S6, the CPU 70 calculates the size of the wide-side frame W based on the following Equation 1. Then, the CPU 70 draws a graphic of the wide-side frame W having the calculated size, within the default wide-image on the angle of view confirmation screen. A drawing position of the wide-side frame W is a predetermined initial drawing position including the tele-side frame T, and for example, the wide-side frame W is drawn so as to be evenly arranged around the tele-side frame T in the center. After this S7, the process returns to S3.

In the present embodiment, the size of the wide-side frame W, that is, a size of an angle of view of the trimming wide-image is decided based on the size of the tele-side frame T, that is, the zoom magnification of the tele-side imaging optical system, the position of the wide-side frame W displayed in the decided size is arbitrarily moved depending on the instruction from the operation unit 74 (however, a range of the movement is limited as described later), an area delimited by the wide-side frame W moved to any position is clipped from the default wide-image, and thereby, the trimming wide-image is obtained. Thereby, the tele-image which is a telephoto image in which a desired subject is zoomed, and the trimming wide-image which is a wide-angle image in which the subject can exist at a position other than the center of the image are simultaneously obtained.

The size of the wide-side frame W is limited to a range from an area whose image is taken at a maximum zoom magnification of the tele-side imaging optical system, to an area extending to an end of the default wide-image. Therefore, an apparent optical zoom magnification a of the trimming wide-image (a ratio of the size of the wide-side frame W to the tele-side frame T) is calculated according to the following Equation 1. This equation is an equation for calculating the magnification in a case where the angle of view of the wide-side imaging optical system is fixed to a maximum wide-angle.

The magnification=a current optical zoom magnification of the tele-side imaging optical system*(1/(the maximum zoom magnification of the tele-side imaging optical system*2)+½)        Equation 1:

For example, if the current optical zoom magnification of the tele-side imaging optical system is 6×, and the maximum zoom magnification of the tele-side imaging optical system is 6×, then $a=6*(1/12+1/2)=6*(7/12)=3.5$ The wide-side frame W can exist at any position as long as the wide-side frame W includes the tele-side frame T.

Figure 4:
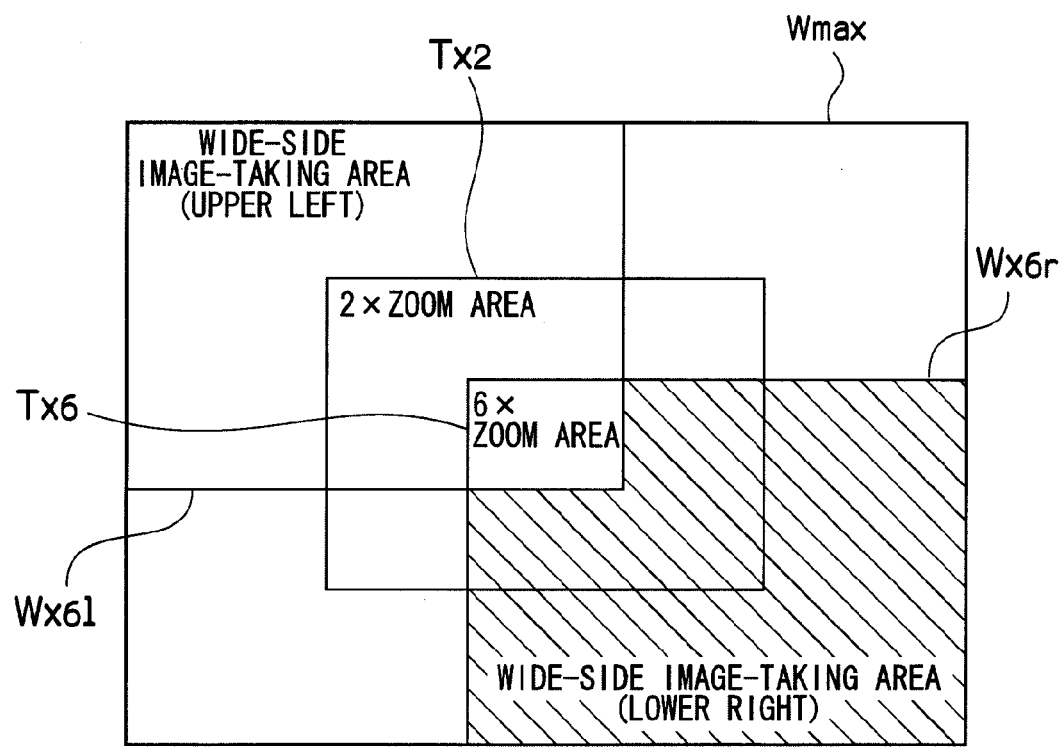
FIG. 4 is a diagram conceptually illustrating a relationship between a position and a size of a tele-side frame T, and a position and a size of a wide-side frame W.

FIG. 4 conceptually illustrates a relationship between the position and the size of the tele-side frame T, and the position and the size of the wide-side frame W. Wmax indicates the outer frame of the default wide-image.

T×6 is the position and the size of the tele-side frame T of 6× zoom designated in S7. The illustrated position of T×6 is merely an example, and may be a position other than the center of the default wide-image.

W×6l is an upper left limit position of the wide-side frame W which can include T×6, within the default wide-image. W×6l includes T×6 at a lower right portion thereof.

W×6r is a lower right limit position of the wide-side frame W which can include T×6, within the default wide-image. W×6r includes T×6 at an upper left portion thereof.

As will be described later, the user can move the wide-side frame W to any position including W×6l and W×6r.

Figure 5:
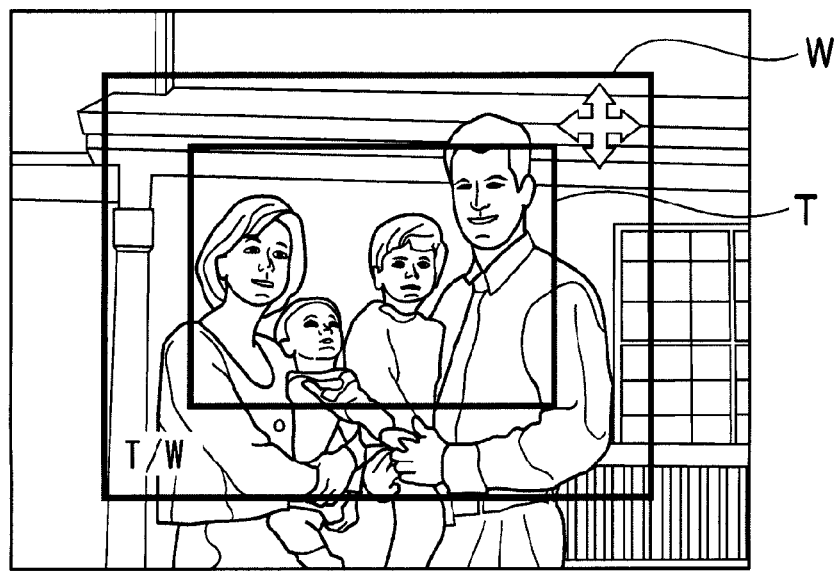
FIG. 5 is a diagram illustrating an example of the wide-side frame W and the tele-side frame T drawn within a default wide-image.

FIG. 5 illustrates an example of the wide-side frame W and the tele-side frame T drawn within the default wide-image in S7.

In S8, the CPU 70 determines whether or not an instruction to perform an image-taking position designation operation for the wide-side frame W is issued from the operation unit 74. If Yes, the process proceeds to S9, and if No, the process returns to S3.

The image-taking position designation operation as herein referred to includes a second instruction to arbitrarily vary the position of the wide-side frame W from the initial drawing position. The position of the wide-side frame W which can be designated by the second instruction may be any position as long as the wide-side frame W includes the tele-side frame T drawn in S2 or S7. For example, the second instruction can be inputted through instructions to move the position of the wide-side frame W in upward, downward, leftward and rightward directions by depressing upward, downward, leftward and rightward direction buttons on a cross key.

The CPU 70 varies the drawing position of the wide-side frame W on the angle of view confirmation screen based on the designated image-taking position. However, this position is restricted by the tele-side frame T drawn in S7, and the wide-side frame W is not drawn at a position not including the tele-side frame T. Moreover, during the variation of the drawing position of the wide-side frame W, the size of this wide-side frame W is not changed and remains in a state of the wide-side frame W drawn in S2 or S7. After this S9, the process returns to S3.

Figure 6:
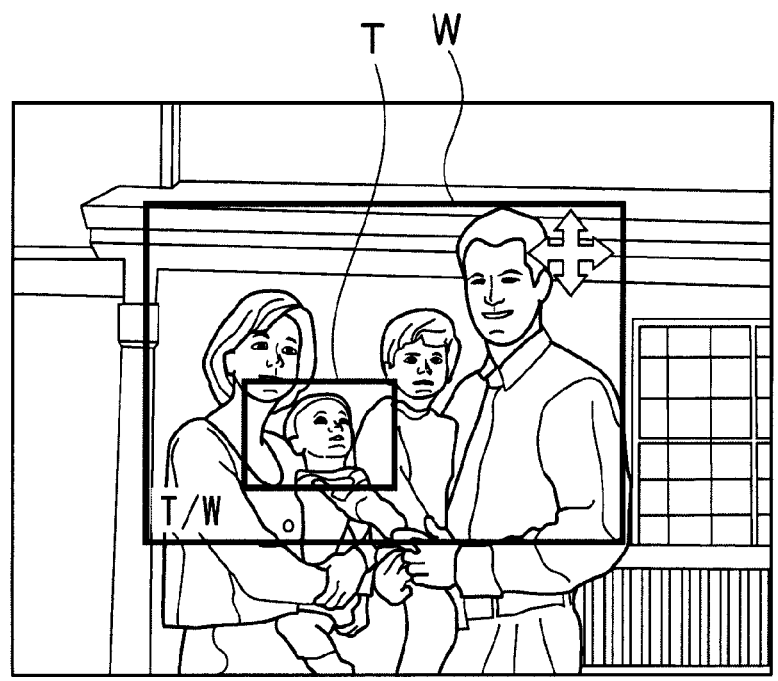
FIG. 6 is a diagram illustrating an example of the wide-side frame W moved within the default wide-image.

FIG. 6 illustrates an example of the tele-side frame T enlarged/reduced in S7 and the wide-side frame W moved within the default wide-image in S9.

According to this process, the tele-side frame T having the position and the size (zoom magnification) surrounding any subject in the default wide-image is displayed, and also, the wide-side frame W including the tele-side frame is displayed, so that the angles of view of both can be confirmed. In addition, the tele-image which is the telephoto image in which the subject within the tele-side frame T is zoomed, and the trimming wide-image which is the wide-angle image delimited by the wide-side frame W which can include the subject at any position other than the center of the image can be simultaneously obtained.

Second Embodiment

In S3 and S4 of the first embodiment, compositions of the trimming wide-image and the tele-image can be easily confirmed as follows.

Figure 7:
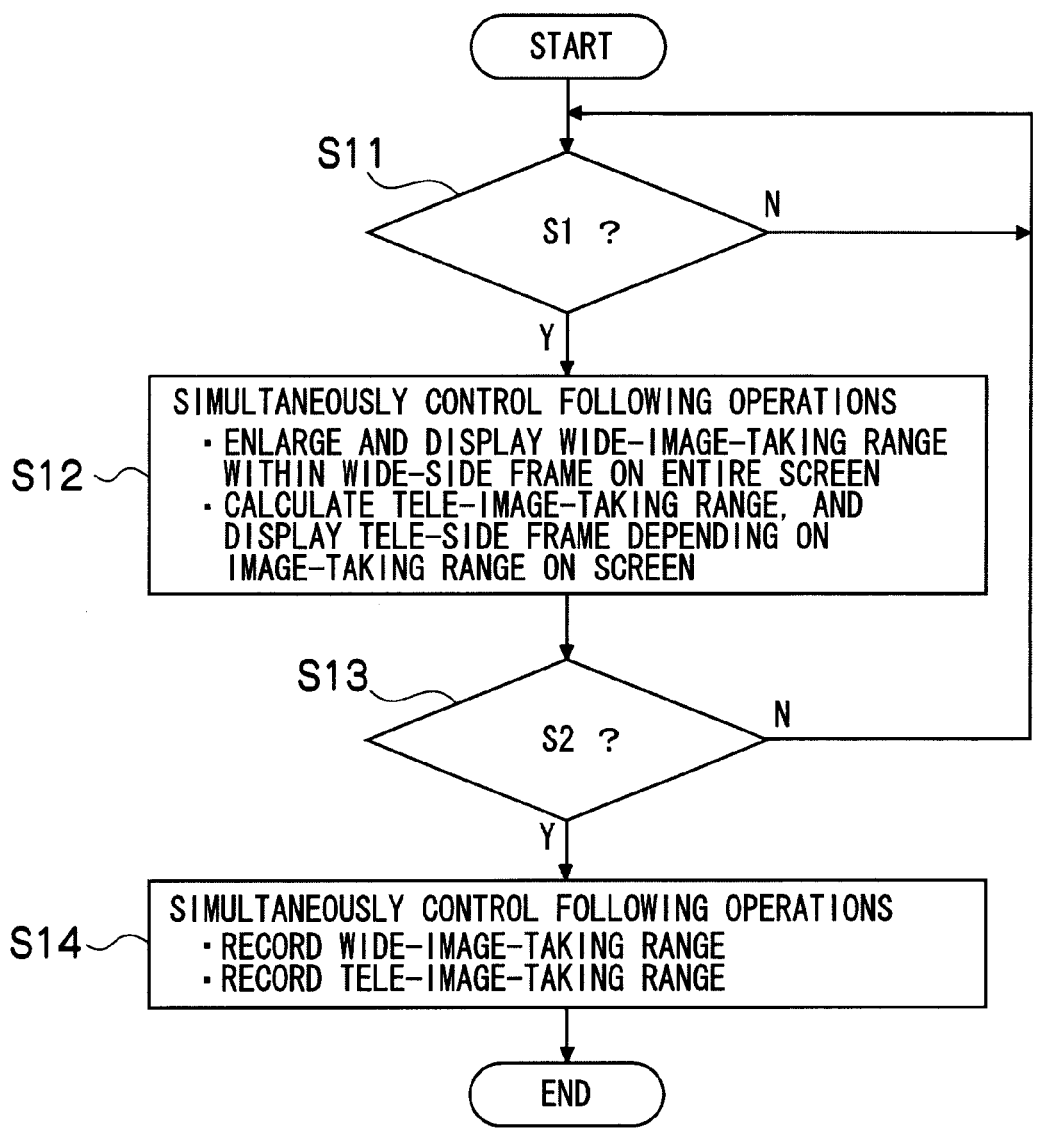
FIG. 7 is a flowchart of a main section of the image taking process according to a second embodiment.

FIG. 7 illustrates a flowchart of a main section of the image taking process according to a second embodiment. This process can be substituted for S3 and S4 of the first embodiment.

In S11, the CPU 70 determines whether or not the release switch of the operation unit 74 has been half-pressed. If Yes, the process proceeds to S12, and if No, this determination is repeated.

In S12, the CPU 70 enlarges an area of the trimming wide-image included in the wide-side frame W so that the area occupies the entire display 26, and displays the area on the display 26. The CPU 70 also enlarges and displays the tele-side frame T at the same display enlargement magnification as that for the wide-side frame W.

Figure 8A:
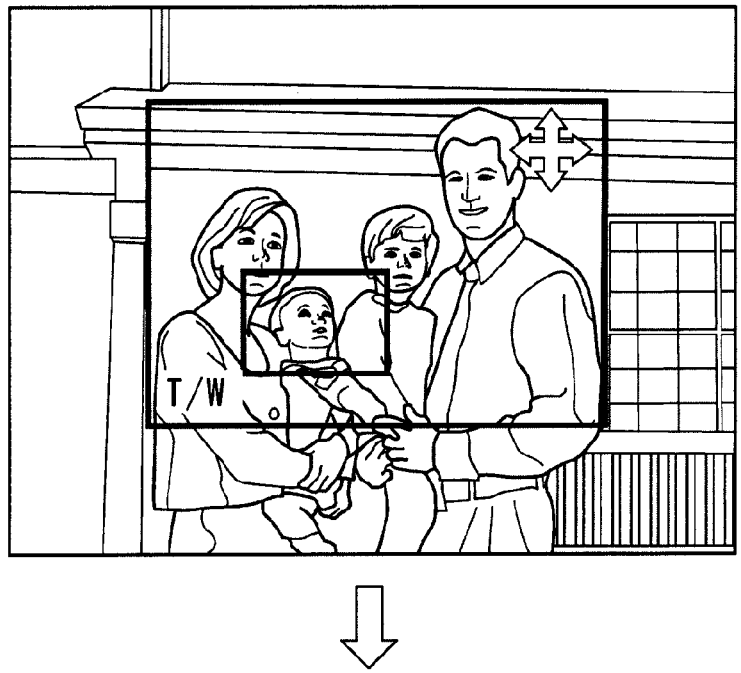
FIGS. 8A and 8B are diagrams illustrating an example of the wide-side frame W and the tele-side frame T displayed in S12.
Figure 8B:

FIGS. 8A and 8B illustrate an example of the wide-side frame W and the tele-side frame T displayed in S12. FIG. 8A illustrates the display before the release switch is half-pressed, and FIG. 8B illustrates the display after the release switch is half-pressed. While a relative positional relationship between the wide-side frame W and the tele-side frame T on the display is not changed between before and after the release switch is half-pressed, the trimming wide-image surrounded by the wide-side frame W is enlarged so as to occupy the entire display 26.

In S13, the CPU 70 determines whether or not the release switch of the operation unit 74 has been fully-pressed. If Yes, the process proceeds to S14, and if No, the process returns to S11.

In S14, the trimming wide-image and the tele-image are obtained similarly to S4.

In this way, in this process, in response to the release switch being half-pressed, the trimming wide-image surrounded by the wide-side frame W is enlarged so as to occupy the entire display 26, and the tele-side frame T is also accordingly enlarged and displayed. Consequently, in the image taking, the angles of view of the trimming wide-image and the tele-image can be easily confirmed, and both the telephoto image in which the desired subject is zoomed up, and the wide-angle image in an optimal composition which can include the subject at the position other than the center of the image can be easily obtained.

Third Embodiment

FIG. 9 illustrates a flowchart of the main section of the image taking process according to a third embodiment.

S21 to S23 are similar to S11 to S13 of the second embodiment.

In S24, the trimming wide-image and the tele-image are obtained similarly to S14. Subsequently, the CPU 70 switches the display on the display 26 from the trimming wide-image to the tele-image.

Figure 10A:
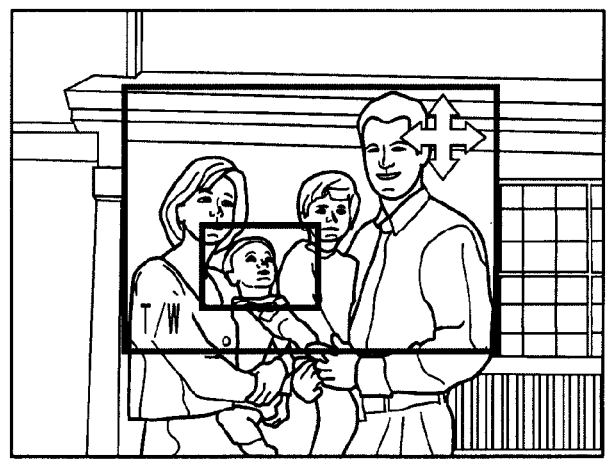
FIGS. 10A to 10C are diagrams illustrating a situation where the default wide-image, a trimming wide-image and a tele-image are sequentially displayed.
Figure 10B:
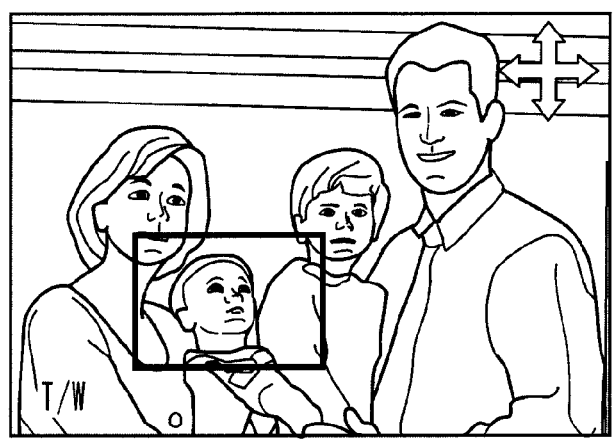
Figure 10C:

In other words, as illustrated in FIG. 10, the default wide-image (FIG. 10A) is displayed when the image taking process is started (S2), the trimming wide-image (FIG. 10B) is displayed when the release switch is half-pressed (S21), and the tele-image (FIG. 10C) is displayed when the release switch is fully pressed (S24), sequentially.

In other words, a limit range of wide-angle image taking with the default wide-image, an image-taking range of the trimming wide-image, and an image-taking range of the tele-image can be easily confirmed.

Fourth Embodiment

FIG. 11 illustrates a flowchart of the image taking process according to a fourth embodiment.

S31 to S37 are similar to S1 to S7 of the first embodiment, respectively. However, after S37 is completed, the process proceeds to S33. In S33 and S34, display methods as in the second and third embodiments (see FIGS. 7 to 10) can also be employed.

In S38, the CPU 70 determines whether or not an instruction to perform the zoom operation for the wide-side imaging optical system is issued from the operation unit 74. If Yes, the process proceeds to S39, and if No, the process proceeds to S40.

The zoom operation as herein referred to includes a third instruction to vary the size of the wide-side frame W, that is, the zoom magnification of the default wide-image.

For example, after the wide-side imaging optical system to be subjected to the zoom operation is selected, the zoom out (magnification reduction) and the zoom in (magnification enlargement) performed by depressing the wide/tele button on the zoom button can be inputted as the third instruction.

In the first embodiment, the zoom magnification of the default wide-image is fixed depending on the initial zoom position. However, here, according to the third instruction, the size of the wide-side frame W, that is, the zoom magnification of the default wide-image can be arbitrarily varied as long as the tele-side frame T is included in the wide-side frame W. The size of the wide-side frame W becomes larger as the default wide-image is zoomed out, and becomes smaller as the default wide-image is zoomed in. In other words, a degree of freedom of movement of the position of the wide-side frame W is decreased by the default wide-image being zoomed in.

In S39, the CPU 70 controls the lens motor 24A to drive the zoom lens of the wide-side imaging optical system based on the third instruction, and sets the zoom magnification corresponding to the third instruction.

The CPU 70 draws the graphics of the wide-side frame W and the tele-side frame T within the default wide-image obtained after the zoom magnification is changed based on the third instruction.

In other words, first, the CPU 70 draws the tele-side frame T having the position and the size corresponding to the magnification set in S32 or S36, within the default wide-image after the magnification is varied as described above. The size of the tele-side frame T is enlarged or reduced according to the varied magnification of the default wide-image. The position of the tele-side frame T does not change between before and after the magnification of the default wide-image is varied, and includes the same subject. Next, the CPU 70 calculates the size of the wide-side frame W based on this size of the tele-side frame T, according to Equation 1. Then, the CPU 70 draws the graphics of the tele-side frame T and the wide-side frame W, which have the calculated positions and sizes, within the default wide-image obtained after the zoom magnification is changed.

S40 are S41 are similar to S8 and S9 of the first embodiment, respectively.

Figure 12A:
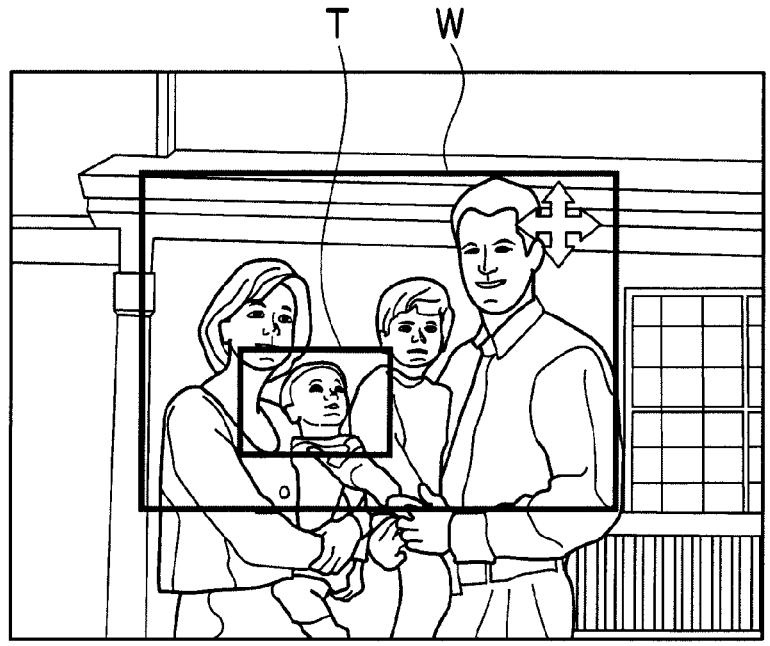
FIGS. 12A and 12B are diagrams illustrating an example of the default wide-image, the wide-side frame W and the tele-side frame T, before and after a magnification of a wide-side imaging optical system is varied.
Figure 12B:
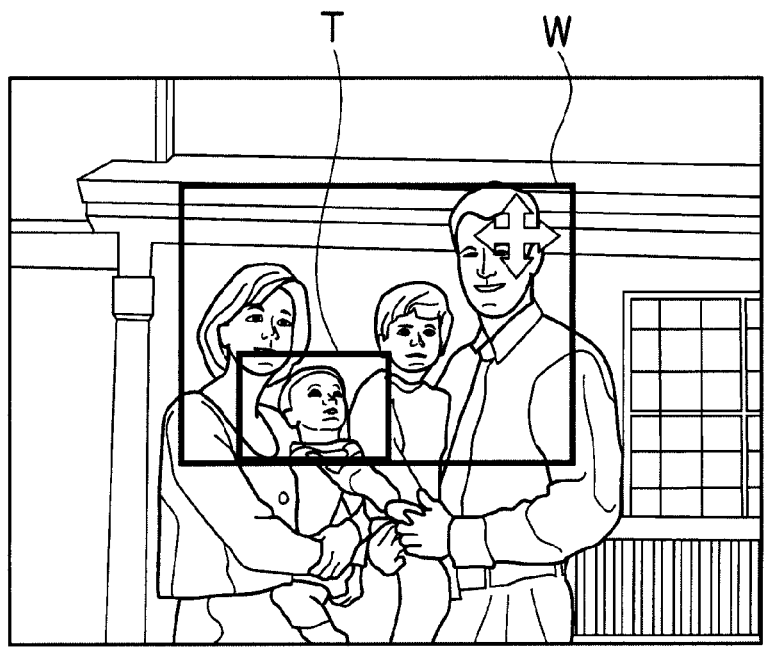

FIGS. 12A and 12B illustrate an example of the default wide-image, the wide-side frame W and the tele-side frame T, before and after the magnification is varied. In these figures, FIG. 12A illustrates a state of the default wide-image before the magnification is varied, and FIG. 12B illustrates a state where the position of the wide-side frame W is moved (S41) after the magnification of the default wide-image is varied (S39).

In this way, if the zoom magnification of the default wide-image can also be changed, both the trimming wide-image and the tele-image having optimal compositions and magnifications can be further easily obtained.

Fifth Embodiment

Figure 13:
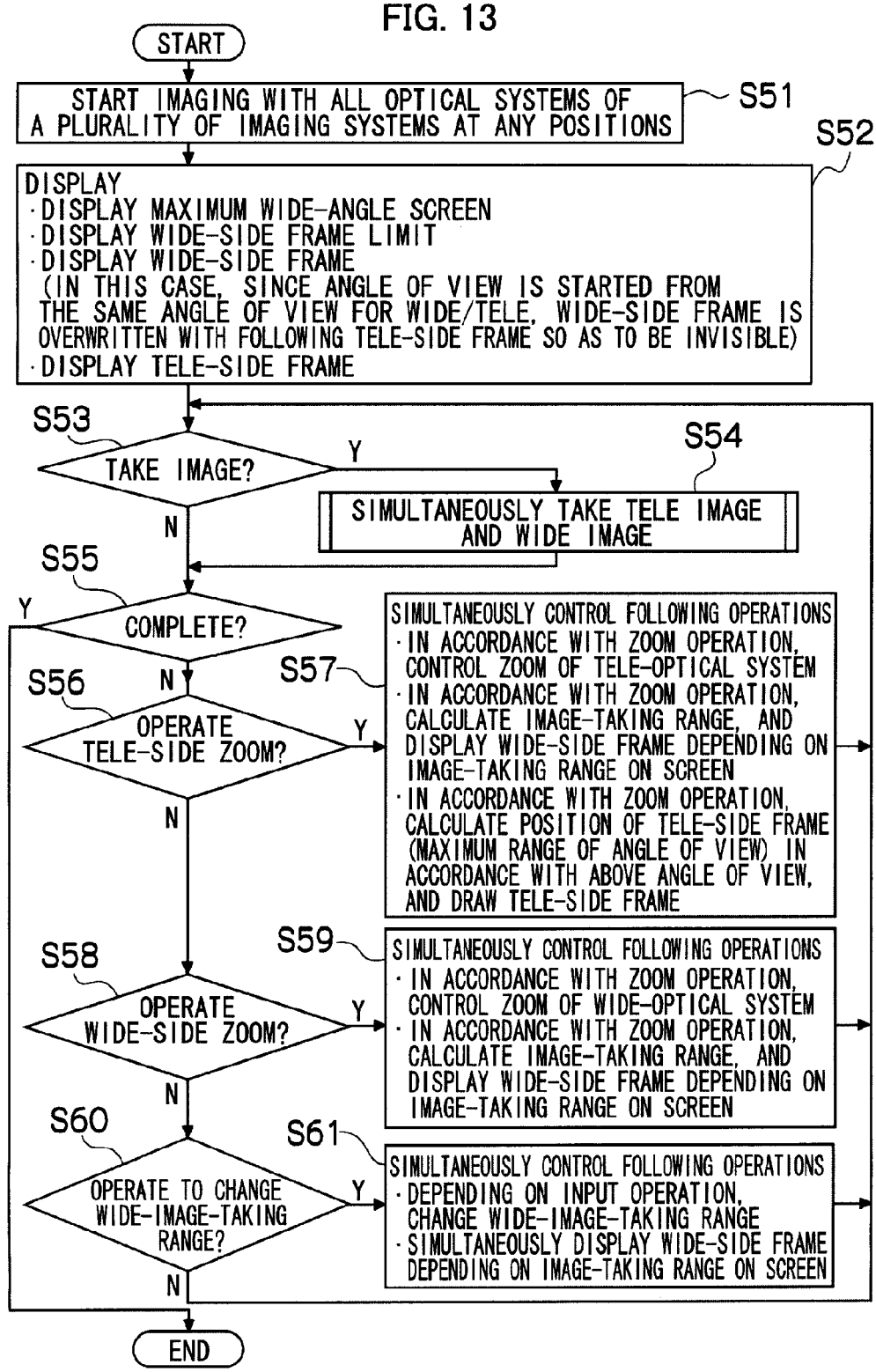
FIG. 13 is a flowchart of the image taking process according to a fifth embodiment.

FIG. 13 illustrates a flowchart of the image taking process according to a fifth embodiment.

S51 to S61 are similar to S31 to S41 of the fourth embodiment, respectively, except S52.

In S52, the wide-side frame W and the tele-side frame T are drawn within the default wide-image on the angle of view confirmation screen, similarly to S32. Furthermore, a maximum wide-side frame Wmax is drawn within the default wide-image on the angle of view confirmation screen.

The maximum wide-side frame Wmax indicates a range of the angle of view when the zoom lens of the wide-side imaging optical system is set at the wide end. In other words, the maximum wide-side frame Wmax is the same as the wide-side frame W when the wide-side imaging optical system is zoomed down to the wide end in S59.

Figure 14:
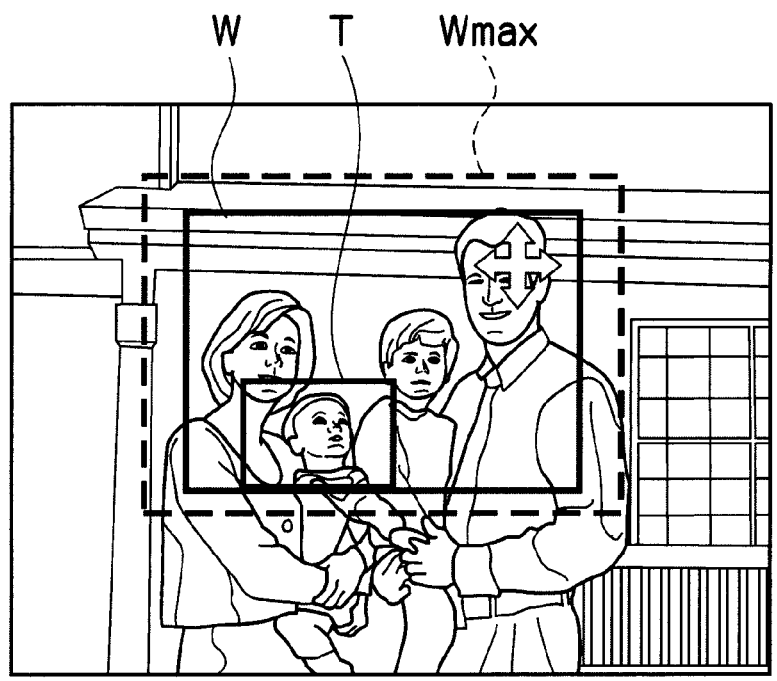
FIG. 14 is a diagram illustrating an example of Wmax, the wide-side frame W and the tele-side frame T which are assigned with graphic attributes which can be distinguished from one another.

As illustrated in FIG. 14, Wmax, the wide-side frame W and the tele-side frame T are assigned with graphic attributes which can be distinguished from one another. For example, Wmax is drawn in a dotted blue line or the like.

In this way, since a maximum range of the wide-angle image is indicated, both the trimming wide-image and the tele-image in the optimal magnifications can be further easily obtained.

Sixth Embodiment

Figure 15A:
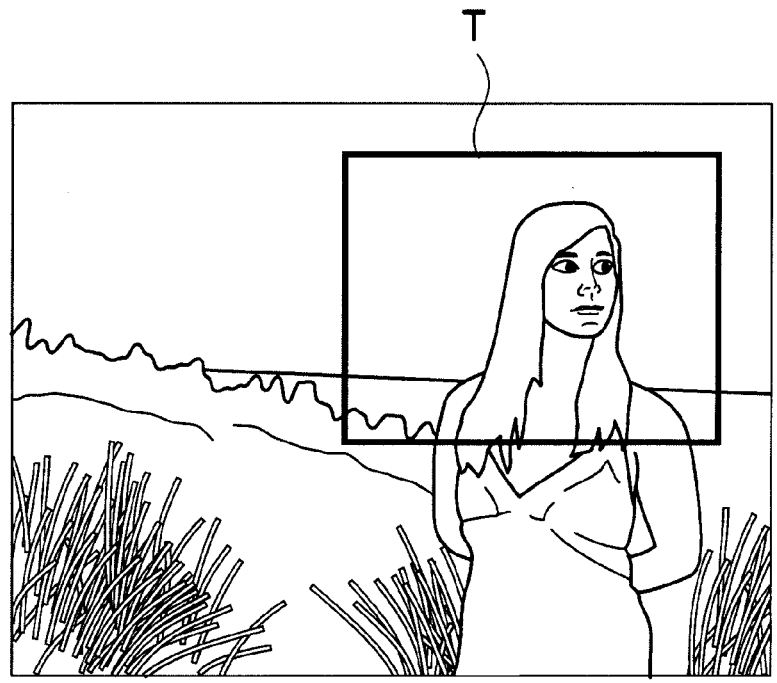
FIGS. 15A and 15B are diagrams illustrating display states of zoomed-up subjects on the default wide-images.
Figure 15B:

In the above described embodiments, in a case where the subject to be zoomed up is indicated in the tele-side frame T on the default wide-image, if the zoom magnification is not large, such as about 2×, the zoomed-up subject can also be relatively clearly recognized on the default wide-image (FIG. 15A). However, if the zoom magnification is large, such as about 10×, the subject to be zoomed up is difficult to be recognized on the default wide-image (FIG. 15B).

Consequently, for example, the default wide-image, the tele-side frame T, the wide-side frame W and the like may be displayed as one of displayed images (such as the strip-shaped image fragments) for the left eye and for the right eye, and the tele-image may be displayed as the other of the displayed images.

Figure 16A:
FIGS. 16A and 16B are diagrams illustrating a situation where the default wide-image or the like is displayed as a left-eye image, and the tele-image is displayed as a right-eye image.
Figure 16B:
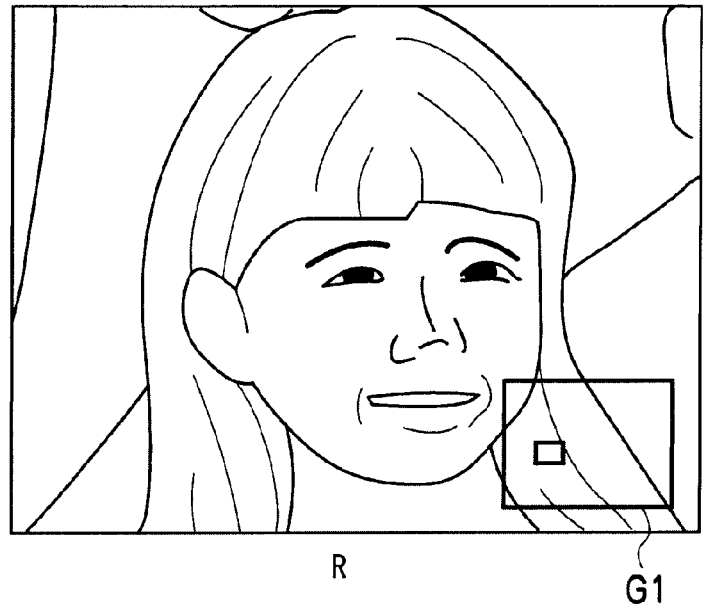

In FIGS. 16A and 16B, the default wide-image and the like are displayed as the displayed image for the left eye (FIG. 16A), and the tele-image and the like are displayed as the displayed image for the right eye (FIG. 16B). Of course, displayed targets for the left eye and the right eye may be reversed. A graphic G1 indicating the position of the tele-side frame T within the default wide-image may be superimposed on the tele-image.

Figure 17:
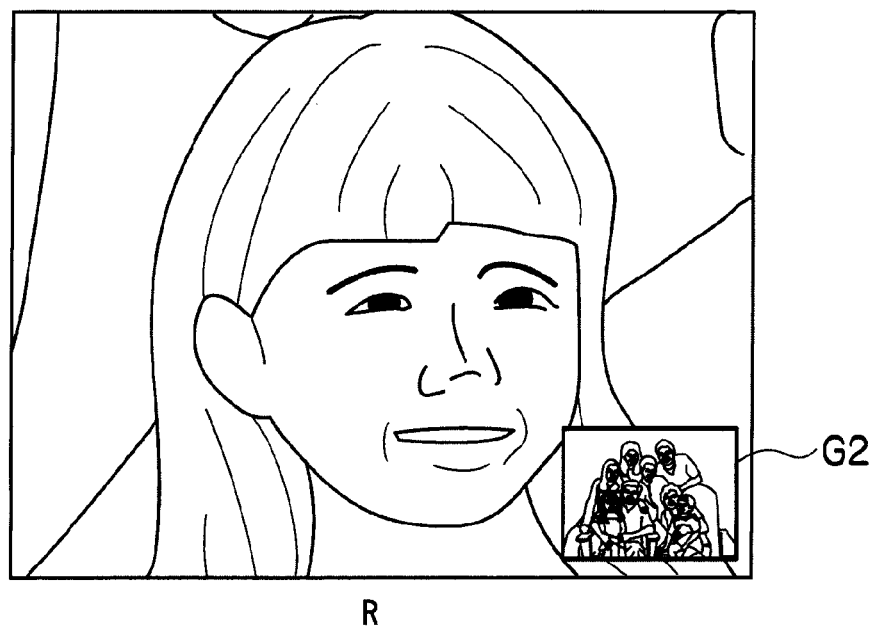
FIG. 17 is a diagram illustrating a situation where a graphic G2 in which the default wide-image, the tele-side frame T, the wide-side frame W and the like are reduced is superimposed on the tele-image.

Alternatively, as illustrated in FIG. 17, a graphic G2 in which the default wide-image, the tele-side frame T, the wide-side frame W and the like are reduced may be superimposed on the tele-image.

In a case of the displays as illustrated in FIGS. 16A and 16B, a photographer can recognize a screen of FIG. 16A if the photographer closes the right eye, and can recognize a screen of FIG. 16B if the photographer closes the left eye. Therefore, not only the angles of view of the tele-image and the trimming wide-image within the default wide-image, but also the angle of view of the tele-image itself can be confirmed.

Figure 18:
FIG. 18 is a diagram illustrating the default wide-image and the tele-image which are mixed.

If the photographer opens both eyes, the photographer recognizes left and right images mixed as illustrated in FIG. 18. However, it is conceivable that people use a dominant eye to preferentially recognize any one of the displayed images for the left eye and for the right eye. Consequently, the CPU 70 accepts setting of any one of the left and right eyes as the dominant eye, from the operation unit 74 or the like, and may display the tele-image or the default wide-image, as the displayed image corresponding to the set dominant eye.

Seventh Embodiment

In the above described embodiments, the composition of the trimming wide-image may not be decided by user, but may be automatically or semi-automatically decided.

For example, a publicly known face detection function (template matching or the like) is mounted on the CPU 70 or the like, a subject which is a person's face is zoomed up by the tele-side imaging optical system, and also the face of the person who is the subject is detected from the default wide-image of the wide-side imaging optical system.

Figure 19A:
FIGS. 19A and 19B are diagrams illustrating a display example of the tele-image including a person who is a subject, and the default wide-image.
Figure 19B:
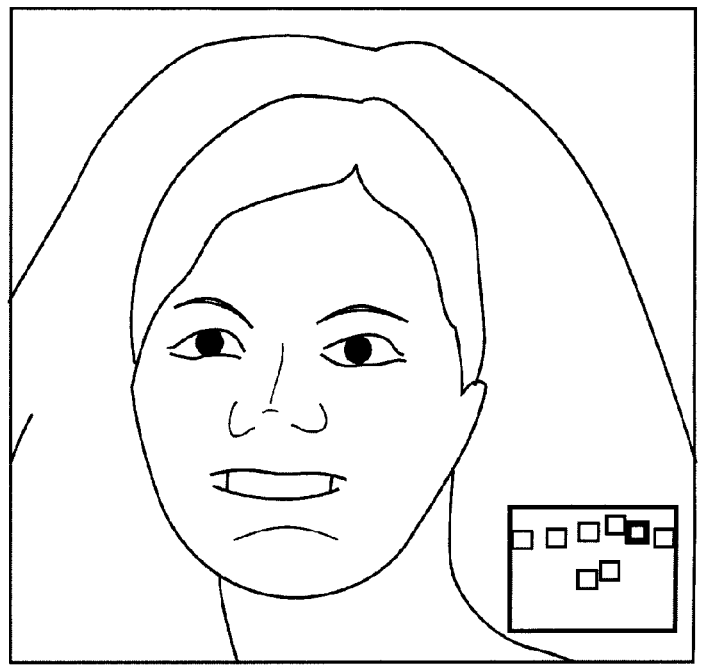
Figure 20:
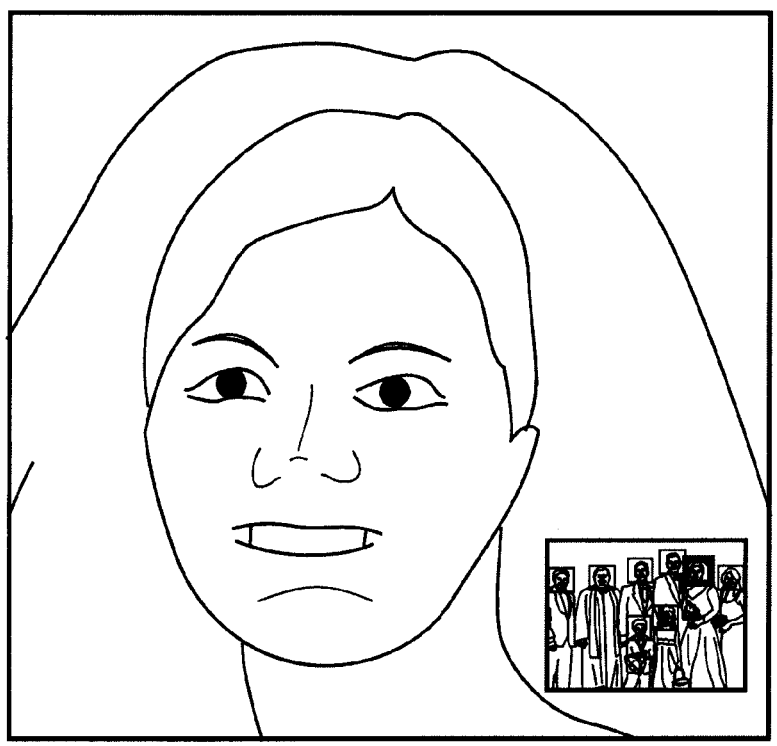
FIG. 20 is a diagram illustrating a display example of the tele-image including the person who is the subject.
Figure 21A:
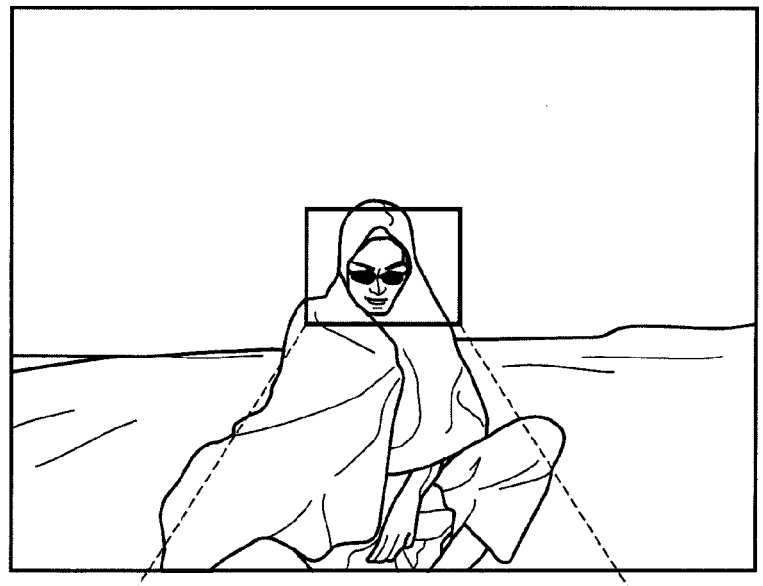
FIGS. 21A and 21B are diagrams illustrating an example in which two tele/wide images are conventionally taken.
Figure 21B:
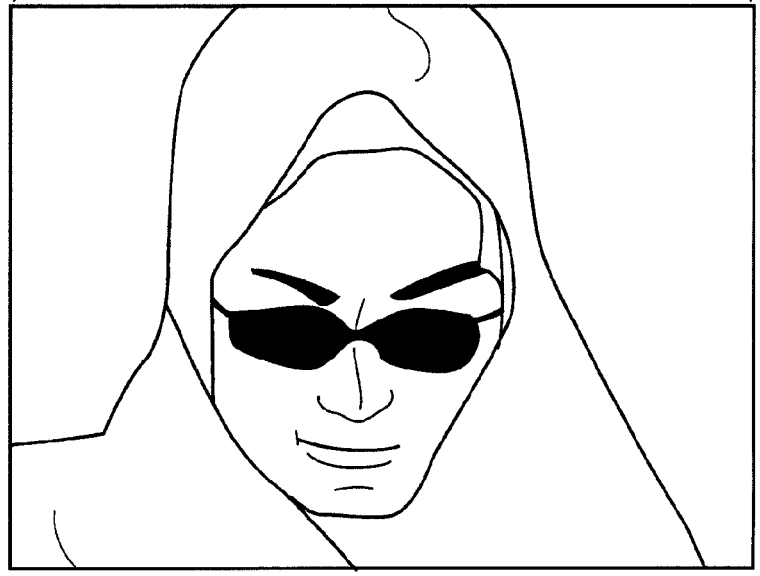
Figure 22A:
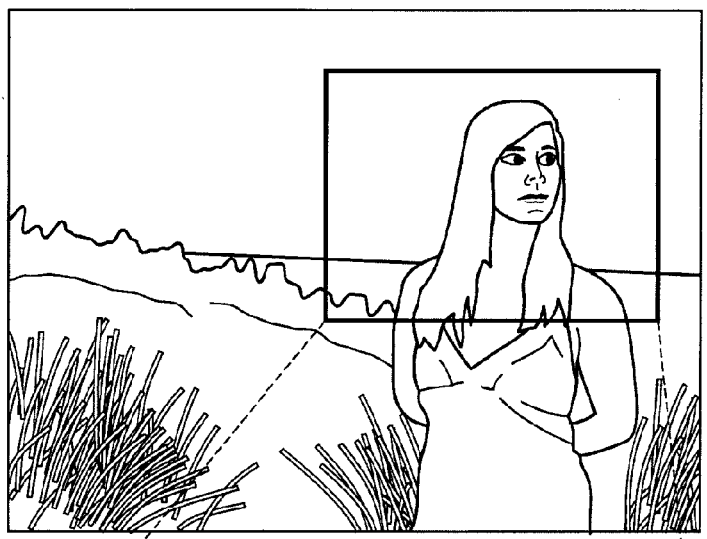
FIGS. 22A and 22B are diagrams illustrating an example in which two tele/wide images are ideally taken.
Figure 22B:

In S9 of the first embodiment, S41 of the fourth embodiment, and S61 of the fifth embodiment, instead of the operation performed by the user for moving the position of the wide-side frame W, the position of the wide-side frame W is moved so as to include the entire face of the person who is the subject and detected from the default wide-image, or so as to include the person who is the subject and arbitrarily designated from the operation unit 74. In this way, the face can also be automatically included in the trimming wide-image. In this case, a method of displaying the tele-image and the default wide-image can be realized similarly to the sixth embodiment (see FIGS. 19A, 19B and 20). It should be noted that this automatically moved position of the wide-side frame W may also be able to be arbitrarily changed by the operation performed by the user for moving the position of the wide-side frame W.

Alternatively, a reference composition may be stored in the ROM 71, and the CPU 70 may move the position of the wide-side frame W so as to conform to the reference composition. The reference composition may be variable depending on the subject, and for example, may be decided depending on a result of the face detection. In addition, the position of the wide-side frame W may be moved based on various composition assist functions (for example, Japanese Patent Application Laid-Open No. 2009-212804).

Also, adjustment of the size of the wide-side frame W in S59 of the fifth embodiment may be changed so as to conform to the reference composition.

Other Embodiments

In the above described embodiments, the tele-image is obtained from the tele-side imaging optical system, and also, the trimming wide-image is clipped from the default wide-image and thus obtained. Consequently, the number of pixels of the trimming wide-image is less than that of the tele-image. For example, if a trimming wide-image is clipped from a full-wide-image of 10 M pixels, the number of pixels of the trimming wide-image becomes less than 10 M pixels.

There are two methods of equalizing the numbers of pixels of the trimming wide-image and the tele-image, as follows.

(1) The tele-image is electronically reduced so that the number of pixels of the tele-image coincides with the number of pixels of the wide-image.

(2) The wide-image is electronically enlarged so that the number of pixels of the wide-image coincides with the number of pixels of the tele-image.

The former method is appropriate if image quality of the wide-image is regarded as important, and the latter method is appropriate if image quality of the tele-image is regarded as important.

What is claimed is:

1. An imaging device which comprises a plurality of imaging units each having an imaging optical system and an imaging element on which a subject image is formed by the imaging optical system, so that the imaging device is capable of obtaining respective viewpoint images from the plurality of imaging units, the imaging device comprising:

an image-taking magnification setting unit which varies a focal length of a first imaging unit in which the focal length of the imaging optical system is variable, in the plurality of imaging units, and thereby sets a desired image-taking magnification of the first imaging unit;

a trimming area decision unit which decides a size of a trimming area which is a partial area capable of including a subject of an image-taking angle of view of the first imaging unit at a desired position, based on the image-taking magnification set by the image-taking magnification setting unit, within an image-taking angle of view of a second imaging unit having the image-taking angle of view larger than the image-taking angle of view of the first imaging unit in the plurality of imaging units;

a display unit which displays a trimming range representing the trimming area having the size decided by the trimming area decision unit, and a first imaging range which is a graphic indicating the subject of the image-taking angle of view of the first imaging unit, so as to be superimposed on a second image which is a wide-angle viewpoint image obtained by the second imaging unit;

a trimming position setting unit which arbitrarily sets a position of the trimming range within the second image displayed on the display unit; and an image output unit which, in response to a predetermined instruction being inputted, outputs a first image obtained by the first imaging unit in which the desired image-taking magnification is set by the image-taking magnification setting unit, and also, clips a trimming image delimited by the trimming range having the size decided by the trimming area decision unit and the position set by the trimming position setting unit, from the second image, and outputs the trimming image.

2. The imaging device according to claim 1, wherein
in response to a predetermined image-taking preparation instruction being inputted, the display unit displays the first imaging range so as to be superimposed on the trimming image outputted by the image output unit.

3. The imaging device according to claim 2, wherein
in response to a predetermined image-taking start instruction being inputted, the display unit displays the first image outputted by the image output unit.

4. The imaging device according to claim 1, wherein
the image-taking magnification setting unit varies a focal length of the second imaging unit in which the focal length of the imaging optical system is variable, and thereby sets a desired image-taking magnification of the second imaging unit, the trimming area decision unit decides the size of the trimming area which is the partial area capable of including the subject of the image-taking angle of view of the first imaging unit at the desired position, within the image-taking angle of view of the second imaging unit, based on the image-taking magnification of the first imaging unit and the image-taking magnification of the second imaging unit which are set by the image-taking magnification setting unit, and the display unit displays the trimming range representing the trimming area having the size decided by the trimming area decision unit, and the first imaging range, so as to be superimposed on the second image.

5. The imaging device according to claim 4, wherein
the display unit displays a graphic indicating a maximum angle of view of the second imaging unit, so as to be superimposed on the second image.

6. The imaging device according to claim 1, wherein
the display unit displays the first image and the second image as left and right viewpoint images.

7. The imaging device according to claim 6, further comprising:
a display setting unit which sets whether one of the first image and the second image is displayed as the left viewpoint image or the right viewpoint image,
wherein the display unit displays one of the first image and the second image, as any one of the left and right viewpoint images, based on the setting in the display setting unit.

8. The imaging device according to claim 1, wherein
the trimming position setting unit sets the position of the trimming range so as to conform to a predetermined composition.

9. The imaging device according to claim 8, further comprising:
a face detection unit which detects a face of a person who is the subject, from the second image,
wherein the trimming position setting unit sets the position of the trimming range so as to include the face detected by the face detection unit.

10. An imaging method in which an imaging device comprising a plurality of imaging units each having an imaging optical system and an imaging element on which a subject image is formed by the imaging optical system, so that the imaging device is capable of obtaining respective viewpoint images from the plurality of imaging units, executes the steps of:

varying a focal length of a first imaging unit in which the focal length of the imaging optical system is variable, in the plurality of imaging units, and thereby setting a desired image-taking magnification of the first imaging unit;

deciding a size of a trimming area which is a partial area capable of including a subject of an image-taking angle of view of the first imaging unit at a desired position, based on the set image-taking magnification, within an image-taking angle of view of a second imaging unit having the image-taking angle of view larger than the image-taking angle of view of the first imaging unit in the plurality of imaging units;

displaying a trimming range representing the trimming area having the decided size, and a first imaging range which is a graphic indicating the subject of the image-taking angle of view of the first imaging unit, so as to be superimposed on a second image which is a wide-angle viewpoint image obtained by the second imaging unit;

arbitrarily setting a position of the trimming range within the displayed second image; and in response to a predetermined instruction being inputted, outputting a first image obtained by the first imaging unit in which the desired image-taking magnification is set, and also, clipping a trimming image delimited by the trimming range having the decided size and the set position, from the second image, and outputting the trimming image.

11. A non-transitory programmable storage medium tangibly embodying a program of machine-readable instructions executable by an imaging device to execute an imaging method according to claim 10.

* * * * *